United States Patent [19]

Nichols

[11] Patent Number: 4,727,537
[45] Date of Patent: Feb. 23, 1988

[54] FLOW CONTROL ARRANGEMENT FOR THE TRANSMISSION OF DATA PACKETS TO A COMMUNICATION NETWORK

[75] Inventor: John M. Nichols, Arvada, Colo.

[73] Assignees: American Telephone and Telegraph Company; AT&T Information Systems, Inc., both of Holmdel, N.J.

[21] Appl. No.: 812,962

[22] Filed: Dec. 24, 1985

[51] Int. Cl.⁴ .................... H04L 11/00; H04L 11/08
[52] U.S. Cl. ....................................... 370/85; 370/94
[58] Field of Search ................. 370/85, 89, 94, 61, 370/80; 340/825.5, 825.51

[56] References Cited

U.S. PATENT DOCUMENTS

| | | | |
|---|---|---|---|
| 3,245,043 | 4/1966 | Gaffney, Jr. et al. | 340/825.5 |
| 3,560,936 | 2/1971 | Busch | 375/26 |
| 3,680,045 | 7/1972 | Meidan | 371/34 |
| 3,825,905 | 7/1974 | Allen, Jr. | 375/114 |
| 3,975,712 | 8/1976 | Hepworth et al. | 370/24 |
| 4,082,922 | 4/1978 | Chu | 370/94 |
| 4,093,823 | 6/1978 | Chu | 370/80 |
| 4,500,990 | 2/1985 | Akashi | 370/85 |
| 4,516,122 | 5/1985 | Tomikawa | 340/825.5 |
| 4,521,882 | 6/1985 | Gabrielli et al. | 370/85 |

FOREIGN PATENT DOCUMENTS 77351 5/1983 Japan ................................... 370/94

OTHER PUBLICATIONS

"Physical Signaling, Medium Attachment, and Baseband Medium Specifications, Type 1BASE5: StarLAN":, IEEE Computer Society, Draft C, Oct. 1985.
Pending Application, Case A. D. Franklin 3, filed 9/11/85, AT&T-IS, Serial Number 774,750, "Flow Control Scheme for a Switching Network".

Primary Examiner—Douglas W. Olms
Assistant Examiner—Melvin Marcelo
Attorney, Agent, or Firm—Donald M. Duft; James M. Graziano; John C. Moran

[57] ABSTRACT

A data transmission flow control arrangement for controlling the flow of data packets to a network as tramsmitted by one or more data transmitting and receiving devices via an interface is disclosed. The disclosed flow control arrangement provides circuitry in the interface responsive to the storage capacity of a buffer included in the interface. If the buffer contains sufficient space to store a data packet of maximum length, data transmissions continue unencumbered. However, if the buffer contains insufficient space to accomodate a data packet of maximum length, the specialized circuitry of the interface responds to this condition and applies a signal to all of the associated transmitting and receiving devices of the interface. The jamming signal simulates the conditions associated with a busy network and therefore, inhibits the transmission of data from any of the associated transmitting and receiving devices. The specialized circuitry of the interface terminates the application of the jamming signal to all associated transmitting and receiving devices when the buffer again contains sufficient space to accommodate a data packet of maximum length.

10 Claims, 6 Drawing Figures

FLOW CONTROL ARRANGEMENT FOR THE TRANSMISSION OF DATA PACKETS TO A COMMUNICATION NETWORK

TECHNICAL FIELD

This invention relates to a data communication network and, in particular, to an interface having a data transmission flow control arrangement for controlling the flow of data packets transmitted from a plurality of associated data transmitting and receiving devices to the network.

BACKGROUND OF THE INVENTION

Data communication networks were popularized with the advent of electronic computers and the development of digital signal processing techniques. A typical data communication network is interconnected with a plurality of data transmitting aand receiving devices by associated interfaces. The data network typically comprises a bidirectional communication bus which provides a medium for data transmission between the transmitting and receiving devices. It is known to use packet-type data transmissions for the communication network. The data transmitting and receiving devices connected to the network or bus via an interface may comprise intelligent or non-intelligent terminals, host computers, digital station sets and personal computers. One or more devices may connect to a single interface, and the interface connects to the communication bus. The interface processes incoming and outgoing packet data transmissions to and from its associated devices.

A problem with the above-described data network is that the network may be subject to periods of high traffic since a number of transmitting and receiving devices may be transmitting data packets concurrently. Several schemes have been proposed to alleviate the traffic problem. One scheme utilizes "windowing" arrangements to control the flow of data packets to the network. In windowing, a transmitting device requests network access via its interface to transmit a data message over the bus. A processor in the interface responds to the request and determines the number of data packets comprising the anticipated data message. The number of data packets define the amount of interface buffer space required to serve the data transmission session. This amount of buffer space is identified as a "window". Following a determination of the window required to accommodate the number of outstanding packets that may be extant, the processor scans the buffer in the interface. If the buffer contains sufficient space to accommodate the requested window, the processor allocates that amount of space and then prompts the transmitting device to begin the session. The processor stores the received packets in the allowed buffer space and then transmits the stored packets over the bus. However, if the interface buffer contains insufficient space to accommodate the requested window size, the processor transmits an indication to the transmitting device to abandon the request, and retry at a latter time.

A disadvantage of the above-described flow control arrangement is that such an arrangement requires a substantial amount of interface processing time to perform the required and complex flow control operations. Processing time is utilized for the administration of the flow control function and for the repeated retransmission requests. Following a first rejected request, a transmitting device again requests network access to determine when the buffer can again accommodate the requested window size. Therefore, a transmitting device can generate several requests over a period of time before buffer space actually becomes available. This retransmission process wastes valuable processing time since each request requires separate processing to determine buffer capacity. The use of a substantial amount of processing time for repeated requests is not cost effective and is an inefficient use of the processor resource with respect to flow control operations.

SUMMARY OF THE INVENTION

To overcome the above-described problems and disadvantages, an interface flow control arrangement for controlling the flow of data packets transmitted from a plurality of data transmitting and receiving devices is disclosed. This arrangement provides circuitry in the interface which detects whether a buffer contains sufficient space to accommodate a data packet of the maximum length that can possibly be received from an associated device. When the buffer contains insufficient space to store a packet of maximum length the interface includes specialized circuitry which generates and applies a jam signal to all of its associated transmitting and receiving data devices. The jam signal simulates the conditions associated with a busy packet bus and inhibits the transmission of data from any of the connected transmitting and receiving devices. The interface terminates the application of the jam signal to all of its associated devices when the buffer again contains sufficient space to accommodate a data packet of maximum length. The disclosed flow control arrangement stops data transmissions from all associated devices whenever there is insufficient interface buffer capacity to store a data packet of maximum length. Therefore, no data transmissions occur until such time as sufficient buffer space is available to store a packet of maximum length.

As previously described, the typical packet network comprises a bidirectional communication bus which interconnects a plurality of interfaces where each interface connects to one or more data transmitting and receiving devices. An interface comprises a processor for processing incoming and outgoing data, a buffer for storing data packets, a selective routing and transmission controller for administering the flow control operation and a plurality of transmit/receive regulators for enabling and disabling the jam signal. Each transmit/receive regulator is associated with a transmitting and receiving device. The interface processor continually monitors the buffer to detect available interface buffer space. When the buffer contains sufficient space to accommodate a data packet of maximum length, the processor receives data transmissions and stores the received transmissions in the buffer.

Assume, now, that the buffer contains insufficient space to accommodate a data packet of maximum length. The processor detects this condition, and generates a control signal. The processor applies this control signal to the selective routing and transmission controller. The controller comprises a flow control register and a flow jam signal generator. In response to the receipt of the control signal, the flow control register generates a flow control signal. The flow control register applies the flow control signal to the plurality of transmit/receive regulators. The flow control register also applies the flow control signal to the flow jam signal generator. The jam signal generator, in response to the flow control signal, generates a jam signal and applies the jam signal to the plurality of transmit/receive regulators. The transmit/receive regulators, in response to the receipt of the flow control signal and the jam signal, are enabled. The regulators extend the jam signal to each associated transmitting and receiving devices. The jam signal inhibits the transmission of any data from all the transmitting and receiving devices served by the interface. The signal remains active until the buffer again contains sufficient space to accommodate a data packet of maximum length. In the above-described manner, the selective routing and transmission controller and the transmit/receive regulators of the interface control the flow of data to the communication bus.

An advantage of the disclosed flow control arrangement is that the flow control function operates independent of continuous processor intervention. When the processor determines that insufficient buffer space exists, the controller and regulator administer the flow control operation by generating and applying the jam signal to all data transmitting and receiving devices associated with the interface. The jam signal continually inhibits all data transmissions until sufficient buffer space to accommodate a data packet of maximum length is available. This continual inhibition eliminates the need for numerous retransmissions to determine available buffer space. Since the disclosed arrangement does not use a substantial amount of processing time to administer flow control operations or to process retransmissions, the disclosed arrangement provides for a number of economics and efficiencies over the prior art.

DETAILED DESCRIPTION

Figure 1:
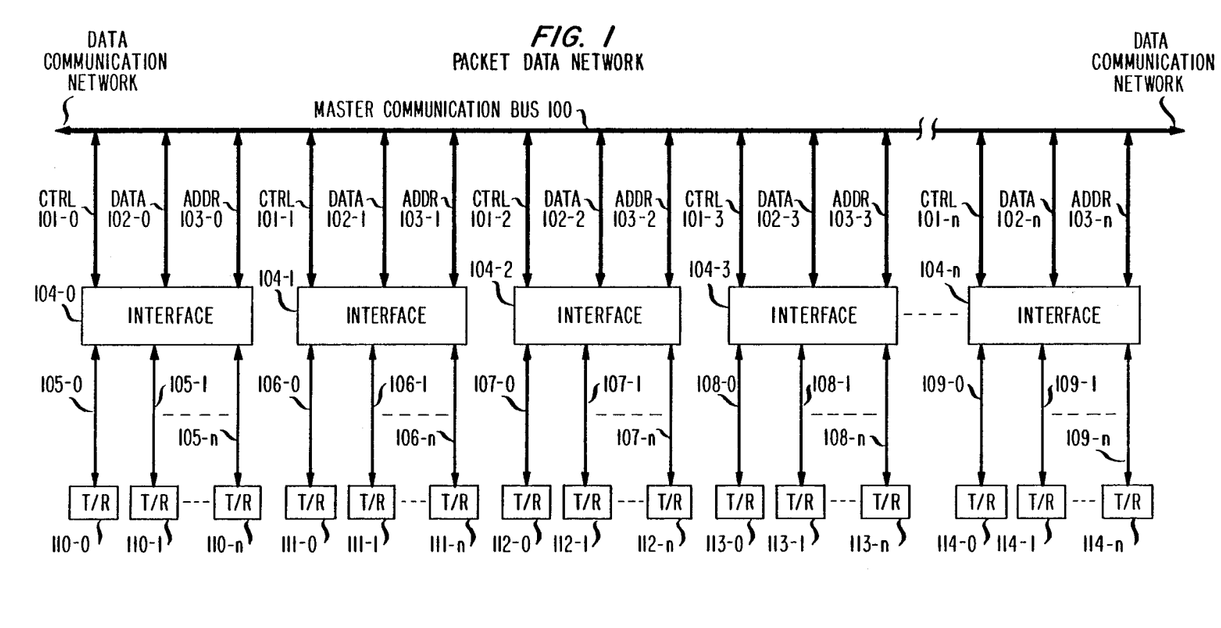
FIG. 1 discloses a data communications network architecture for packet data transmissions.

FIG. 1 illustrates a typical architectural structure of a data communication network. The network comprises a bidirectional master communication bus 100, a plurality of data transmitting and receiving (T/R) devices 110-0 through 110-n, 111-0 through 111-n, 112-0 through 112-n, 113-0 through 113-n and 114-0 through 114-n, and a plurality of interfaces 104-0 through 104-n. Assume for the remainder of this description that the data network serves to exchange data packets of information between data transmitting and receiving devices. Data packet transmission is known to the art and therefore, no further details are provided.

Each data packet includes control information which controls the data transmission, data information which comprises the actual data message, and address information which identifies the origin and destination of the data packet. The entire data packet is typically applied to and from the interface of a destination transmitting and receiving device or an originating transmitting and receiving device over a common bidirectional bus which extends from the master communication bus to the interface. However, for ease of description, each type of information has an associated bidirectional bus such that control data is applied over control buses 101-0 through 101-n, message data is applied over data buses 102-0 through 102-n, and address data is applied over address buses 103-0 through 103-n. The control, data, and address buses interconnect master communication bus 100 to interfaces 104-0 through 104-n.

Interfaces 104-0 through 104-n process incoming and outgoing data packets of information. The processes include formatting and unformatting data packets, determining the originating and destination transmitting and receiving device, routing data packets, extending data messages to and from an originating and destination transmitting and receiving device, and controlling access to and from master communication bus 100. The details of the illustrated interfaces of FIG. 1 are discussed subsequently. Each interface 104-0 through 104-n performs shared processing operations for a plurality of associated connected transmittting and receiving devices. Transmitting and receiving (T/R) devices 110-0 through 110-n, 111-0 through 111-n, 112-0 through 112-n, 113-0 through 113-n, and 114-0 through 114-n are connected to associated interfaces 104-0 through 104-n over bidirectional paths 105-0 through 105-n, 106-0 through 106-n, 107-1 through 107-n, 108-0 through 108-n, and 109-0 through 109-n, respectively. Data transmissions are received from and transmitted to interfaces 104-0 through 104-n over these bidirectional paths. The transmitting and receiving (T/R) devices of FIG. 1 may be any type of data generating devices such as a personal computers, intelligent or non-intelligent terminals, host computers or digital station sets. For ease of description, the transmitting and receiving (T/R) devices of FIG. 1 are referred to as T/R devices.

Figure 2:
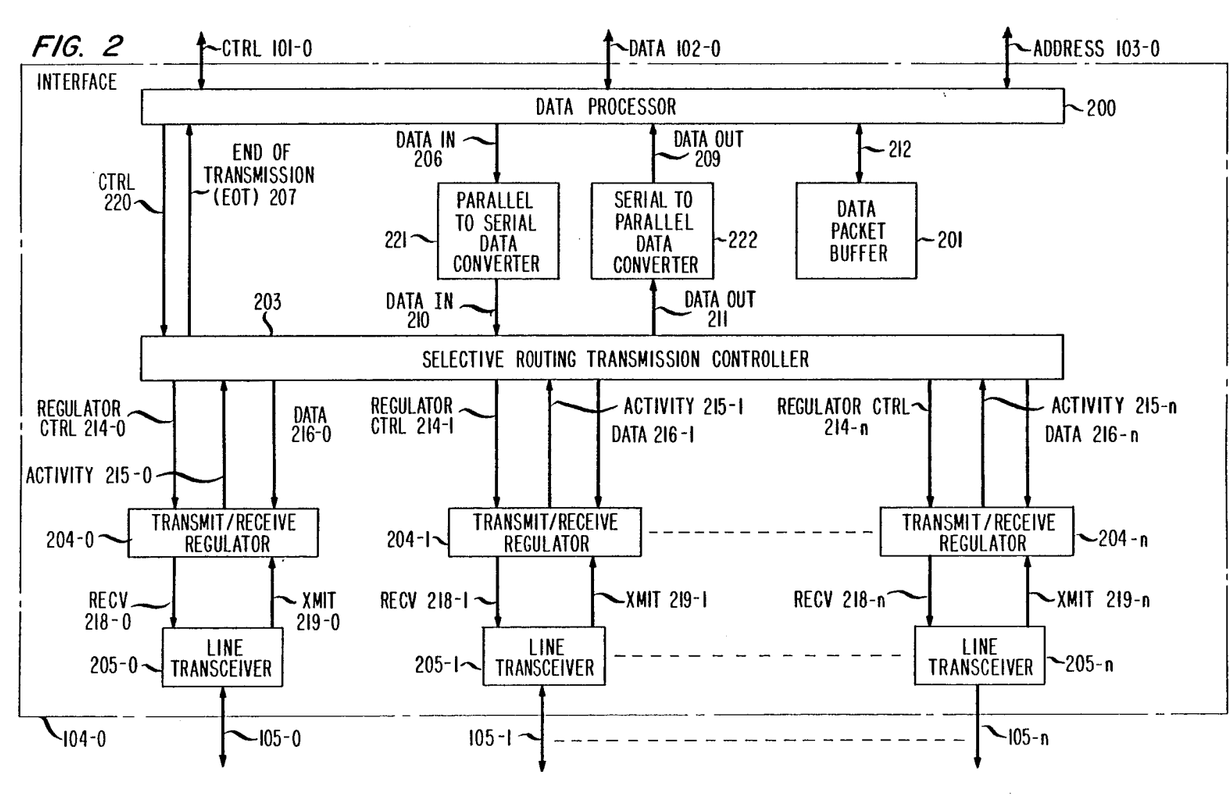
FIG. 2 discloses the details of an interface of the network of FIG. 1.

FIG. 2 illustrates the details of one interface such as interface 104-0 of FIG. 1. Interface 104-0 processes incoming and outgoing data transmissions for a plurality of associated T/R devices 110-0 through 110-n as received from or transmitted to master communication bus 100. Interface 104-0 comprises data processor 200, parallel to serial and serial to parallel data converters 221 and 222, respectively, data packet buffer 201, selective routing and transmission controller 203, transmit/receive regulators 204-0 through 204-n and line transceivers 205-0 through 205-n. Data processor 200 scans master communication bus 100 for data packets over buses 101-0, 102-0 and 103-0, controls access to and from master communicatioon bus 100 by detecting the busy/idle status of master communication bus 100, formats and unformats outgoing and incoming data packets of information, identifies the origin and destination of the outgoing and incoming data transmissions, determines the start of and termination of incoming and outgoing data transmissions and continually monitors buffer 201 to detect the amount of available storage space. The process of continually monitoring the buffer is discussed subsequently in FIGS. 5 and 6. Processor 200 connects to data packet buffer 201 over bidirectional path 212. Buffer 201 is typically a readable and writable RAM-type memory. Buffer 201 stores a plurality of data packets to await data processing by processor 200 prior to accessing master communication bus 100. The scheme utilized by processor 200 to access the network is not described since this scheme comprises no part of the disclosed invention and is well known to the art.

Processor 200 connects to selective routing and transmission controller 203 over paths 220 and 207, and, indirectly, over paths 210 and 211 via converters 221 and 222. Converter 221 connects to processor 200 over path 208 and performs parallel to serial data conversion on incoming data transmissions; and converter 222 connects to processor 200 over path 209 and performs serial to parallel data conversion of outgoing data transmissions. Converters of the above-described type are known to the art and are, therefore, not described in further detail. Converters 221 and 222 connect to controller 203 over paths 210 and 211, respectively.

Controller 203 and regulators 204-0 through 204-n comprise the hardware for the disclosed subject invention. Controller 203 and regulators 204-0 through 204-n control the data transmission flow from T/R devices 110-0 through 110-n by jamming all T/R devices 110-0 through 110-n when buffer 201 cannot store or accommodate a data packet of maximum length. The details of controller 203 are described subsequently. Controller 203 connects to transmit/receive regulators 204-0 through 204-n over paths 214-0 through 214-n, 215-0 through 215-n, and 216-0 through 216-n. Each transmit/receive regulator 204-0 through 204-n is associated with a T/R device 110-0 through 110-n. Transmit/receive regulators 204-0 through 204-n comprise the logic to regulate the transmission of data to and from the associated T/R devices 110-0 through 110-n. Further details of transmit/receive regulators 204-0 through 204-n are discussed subsequently.

Each transmit/receive regulator 204-0 through 204-n connects to an associated line transceiver 205-0 through 205-n over paths 218-0 through 218-n and 219-0 through 219-n, respectively. Line transceivers 205-0 through 205-n drive incoming and outgoing data transmissions along the appropriate data transmission path to either an associated destination T/R device or to the associated regulator. Line transceivers are known to the art and therefore, no further detail is provided.

The above description identifies each element of the interface and describes, in general, the purpose of each element within the interface. The following description describes the functions and operations of the elements only with respect to an outgoing data transmission. The operations of the interface with respect to incoming data transmissions are not relevant to the discussion and the purpose of this invention. Therefore, the remainder of this description discusses only outgoing data transmission from any one or more T/R devices 110-0 through 110-n to master communication bus 100.

Assume that one or more T/R devices 110-0 through 110-n are transmitting data to access the network. For ease of description, only one T/R device, 110-0, is discussed; however, the other T/R devices 110-1 through 110-n operate in the same manner. Assume further that buffer 201 has sufficient space to accommodate a data packet of maximum length. T/R device 110-0 applies data to line transceiver 205-0 over lead 105-0. Line transceiver 205-0 applies the outgoing data transmission to regulator 204-0 over XMIT path 219-0. Regulator 204-0 applies the outgoing data transmission to controller 203 over path 216-0. Regulator 204-0, concurrently, applies an activity signal to selective routing and transmission controller 203 over path 215-0. The activity signal indicates that a T/R device is actively transmitting data. Controller 203 responds to the receipt of the activity signal on path 215-0 and the data on path 216-0 by concurrently executing the following operations.

Controller 203 applies the generated data to converter 222 over path 211. Converter 222 converts the data from a serial data stream to a parallel data configuration and applies the parallel data to processor 200 over path 209. Assume now that processor 200 cannot currently access master communication bus 100. Processor 200 applies the received data transmission over path 212 to buffer 201. Processor 200 scans master communication bus 100 to detect the busy/idle status of the bus. When processor 200 detects that master communication bus 100 is idle, processor 200 retrieves from buffer 201 over path 212 the transmitted data packet and applies the packet to master communication bus 100 over control path 101-0, data path 102-0 and address path 103-0. The processes by which processor 200 detects an idle status on bus 100 is not described since that process does not comprise any portion of the subject invention and is well known to the art. Controller 203 also "echoes back" the outgoing data transmission to the T/R device, 110-0, originating the data transmission. Controller 203 "echoes back" the outgoing data transmission to all T/R devices 110-0 through 110-1 by processing the outgoing data transmission through the data merger function which provides a common data transmission path for all data transmissions. This process is discussed subsequently in connection with FIG. 3. However, the remaining discussion is with respect to T/R device 110-0. The "echo back" data is an error checking function to confirm the accuracy of the data transmission. Controller 203 applies the "echo-data" to transmit/receive regulator 204-0 over path 216-0. Transmit/receive regulator 204-0 applies the "echo-data" to line transceiver 205-0 over receive path 218-0. Line transceiver 205-0 applies the "echo-data" to T/R device 110-0 over transmission path 105-0.

At the conclusion of a data transmission by T/R device 110-0, no data appears on path 216-0 and an inactive activity signal exists on path 215-0. Controller 203 responds to the lack of data on path 216-0 and the absence of the activity signal on path 215-0 and generates an active End of Transmission (EOT) signal to indicate a termination of the data transmission. Controller 203 applies the active EOT signal to processor 200 over path 207. Processor 200 detects the termination of the data transmission in response to the receipt of the active EOT signal. The details of the EOT signal with respect to processor 200 are discussed subsequently.

The above description discusses the function of the elements of the interface with respect to an outgoing data transmission from one of the T/R devices of the interface. Assume now that multiple T/R devices such as 110-0 through 110-n are concurrently transmitting data. Data is applied to line transceivers 205-0 through 205-n and regulators 204-0 through 204-n in the manner previously described. In response to multiple transmissions, regulators 204-0 through 204-n each generate activity signals indicating data transmission activity. Regulators 204-0 through 204-n apply the activity signals to controller 203 over associated paths 215-0 through 215-n. Regulators 204-0 through 204-n apply the data transmissions to controller 203 over associated data paths 216-0 through 216-n. Controller 203 merges the incoming data transmissions on paths 216-0 through 216-n to generate a single convoluted data output over path 211. The process of merging data is discussed subsequently in FIG. 3. Controller 203 extends the convoluted data to processor 200 over path 209. However, processor 200 ignores the received convoluted data since processor 200 cannot process intermixed data messages. Processor 200 only process a single data transmission at one time. Controller 203, as previously described, "echoes-back" the data transmission. However, since several data transmissions are merged into a single convoluted data stream, controller 203 applies the convoluted data transmission to all associated T/R devices 110-0 through 110-n over data paths 216-0 through 216-n. Regulators 204-0 through 204-n extend the convoluted data resulting from multiple transmission activity to all T/R devices 110-0 through 110-n over paths 105-0 through 105-n. In response to a receipt of the convoluted data on paths 105-0 through 105-n, all T/R devices 110-0 through 110-n stop transmitting because of the receipt of convoluted data indicating multiple activity. Only a single data transmission can be processed at a time, and therefore any multiple data transmission activity precludes proper data processing operations.

The above-description discusses both a single data transmission from one T/R device and multiple data transmissions occurring simultaneously from multiple T/R devices. In both cases, buffer 201 had sufficient space to accommodate a data packet of maximum length. Now, assume that buffer 201 does not have sufficient space to accommodate any further transmitted data packets of maximum length, and that no data transmissions are currently occurring. The EOT signal on path 207 is active to indicate no data transmission activity is present. The process of detecting sufficient space in buffer 201 is discussed in connection with FIGS. 5 and 6.

In response to the detection of insufficient buffer space in buffer 201, processor 200 generates a control signal to controller 204 over path 220. Controller 203, discussed in detail subsequently, generates a regulator control signal. Controller 203 applies the regulator control signal to regulators 204-0 through 204-n over paths 214-0 through 214-n. Regulators 204-0 through 204-n extend the regulator control signal through transceivers 205-0 through 205-n to T/R devices 110-0 through 110-n over paths 105-0 through 105-n. The regulator control signal jams T/R devices 110-0 through 110-n so that no data transmissions can occur while the regulator control signal is active. The regulator control signal remains active until such time as processor 200 detects that buffer 201 can accommodate a data packet of maximum length. Following the detection of adequate buffer space, processor 200 terminates the control signal on path 220 which deactivates the regulator control signal on paths 214-0 through 214-n. In response to the termination of the regulator control signal, normal data transmissions from T/R devices 110-0 through 110-n are extended to processor 200.

Figure 3:
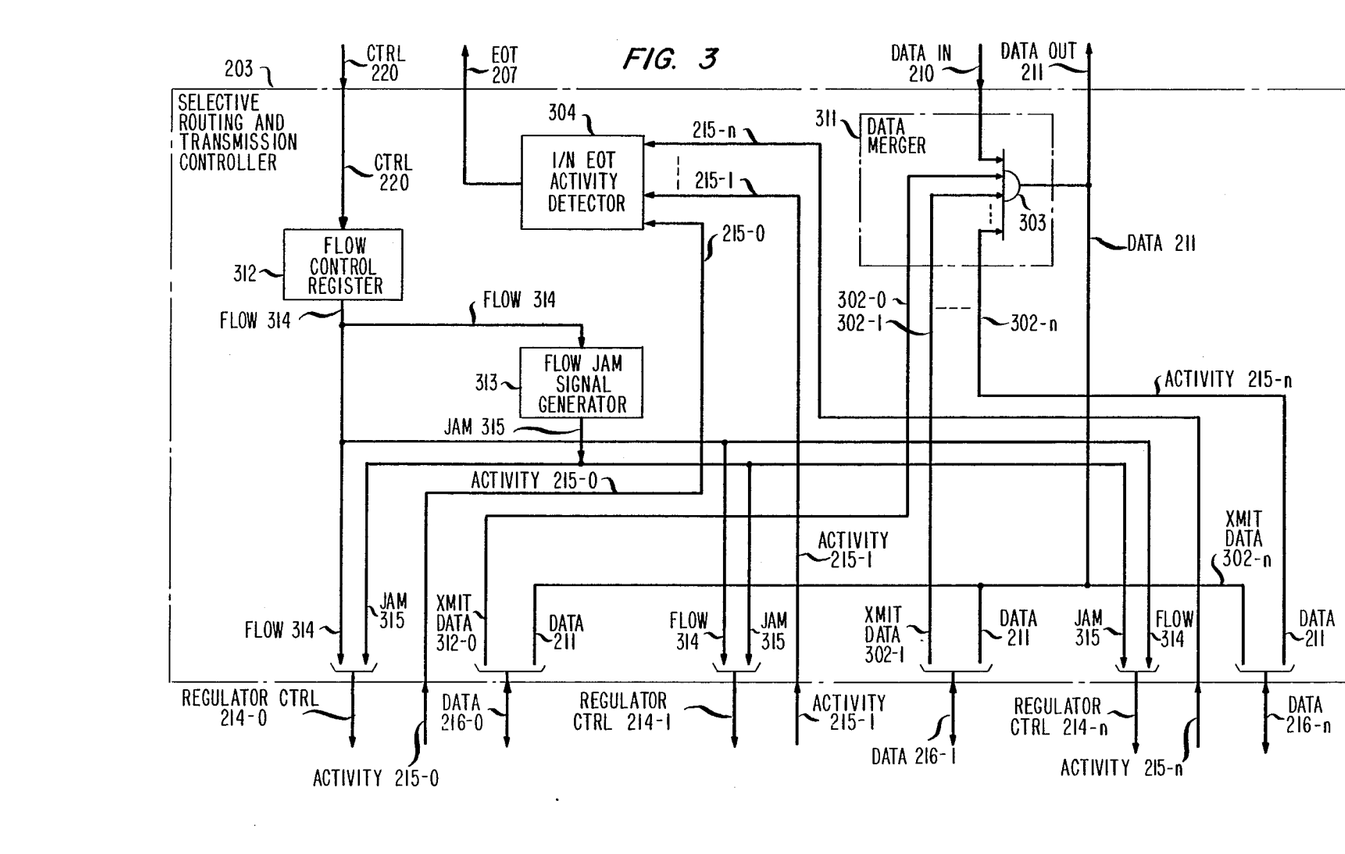
FIG. 3 discloses the details of a selective routing and transmission controller which comprises the interface of FIG. 2.

FIG. 3 illustrates the circuit details of selective routing and transmission controller 203 which comprises interface 104-0. Controller 203 comprises data merger 311, 1/N EOT activity detector 304, flow control register 312, and flow jam signal generator 313.

The following describes the operations and functions of the elements of controller 203 with respect to an outgoing data transmission from one T/R device such as T/R device 110-0. Assume further that buffer 201 has sufficient space to accommodate a maximum length data packet. Data generated from T/R device 110-0 is received by controller 203 over data path 216-0. Data 216-0 applies the generated data transmission to data merger 311 over XMIT path 302-0. Data 216-0 comprises XMIT data 302-0 and data 211 paths. For ease of description, however, only a single bidirectional path 216-0 is shown as connected to controller 203. Data merger 311 extends the transmitted data through multi-input AND gate 303. AND gate 303 extends the transmitted data to data path 211. Controller 203 extends the data to processor 200 on path 211 in the manner and for the processing operations previously described. As previously discussed, controller 203 extends "echo-data" to each T/R device 110-0 through 110-n over paths 216-0 through 216-n. The "echo-data" is a result of the ANDing function of multi-input AND gate 303. The output of AND gate 303 is a single bidirectional data transmission path, Data 211, where the transmitted data is extended to both processor 200 and T/R devices 110-0 through 110-n. In particular, controller 203 applies the "echo-data" on data path 211 over data paths 216-0 through 216-n. All regulators 204-0 through 204-n receive "echo-data" over data paths 216-0 through 216-n. Regulators 204-0 through 204-n extend the "echo-data" to T/R devices 110-0 through 110-n. As previously described the "echo-data" performs an error checking function to determine the accuracy of the data transmission.

T/R device 110/0, as previously described, also generates an activity signal indicative of data transmission activity. The activity signal on path 215-0 is applied to 1/N EOT detector 304. In response to the receipt of the activity signal, detector 304 generates an inactive EOT signal to indicate that a data transmission is currently in progress. Detector 304 applies the inactive EOT signal to processor 200. The inactive EOT signal indicates to processor 200 that a data transmission is presently occurring. If more than one T/R device 110-0 through 110-n is concurrently transmitting data, for example, data merger 311 receives data inputs over paths 302-0 through 302-n. AND gate 303 merges all incoming data transmissions and generates "convoluted" data over path 211, as previously described. When concurrent multiple data transmissions occur, detector 304 receives activity signals over paths 215-0 through 215-n. Detector 304 generates an inactive EOT signal which indicates data transmission activity. If no transmission activity is present, an active EOT signal is applied from detector 304 to processor 200 over path 207. An active EOT signal indicates that no data transmission(s) are currently occurring.

Assume, now, that following the conclusion of the above-described data transmission as indicated by an active EOT signal on path 207, processor 200 detects that buffer 201 can no longer accommodate a maximum size data packet. The process of determining available buffer space is discussed with respect to FIGS. 5 and 6. In response to this detection, processor 200 generates a control signal to controller 203 over path 220. The control signal is essentially an on/off type signal which when active turns on flow control register 312. In response to the active control signal on path 220, flow control register 312 generates a flow signal. Register 312 applies the flow signal to regulators 204-0 through 204-n over path 314 and to flow jam signal generator 313 over path 314. Generator 313 generates a jam signal in response to the receipt of the flow signal on path 314. The generated jam signal may conform to the CSMA/CD standards set forth by the IEEE Task Force 802.3 in the IEEE Draft C, October 1985 paper entitled "Physical Signalling, Medium Attachment, and Baseband Medium Specification Type IBASE5". Generator 313 applies a jam signal to regulator 204-0 through 204-n over path 315. Both signals, jam and flow, are applied over regulator control paths 214-0 through 214-n. Regulators 204-0 through 204-n, as previously described, extends the control signal comprising the jam and flow signal to T/R devices 110-0 through 110-n. This signal prevents T/R devices 110-0 through 110-n from generating any data transmissions. This arrangement prevents processor 200 from receiving overflow data. Since at this time, the buffer, 201 cannot accommodate a data packet of maximum length. When the data buffer can again accommodate a data packet of maximum length, processor 200 "turns off" the control signal on path 220 which in turn turns off flow control register 312. In response to the lack of an active control signal, register 312 stops generating a flow signal over path 314. In response to the lack of an active flow signal, generator 313 stops generating a jam signal over path 315. The inactivity of the flow and jam signal prevent an active signal on regulator control paths 214-0 through 214-n and therefore, the jam signal at each T/R device 110-0 through 110-n is removed. Each T/R device 110-0 through 110-n may now begin normal transmission operations since buffer 201 can now accommodate a data packet of maximum length. The process of detecting buffer space is discussed subsequently.

Figure 4:
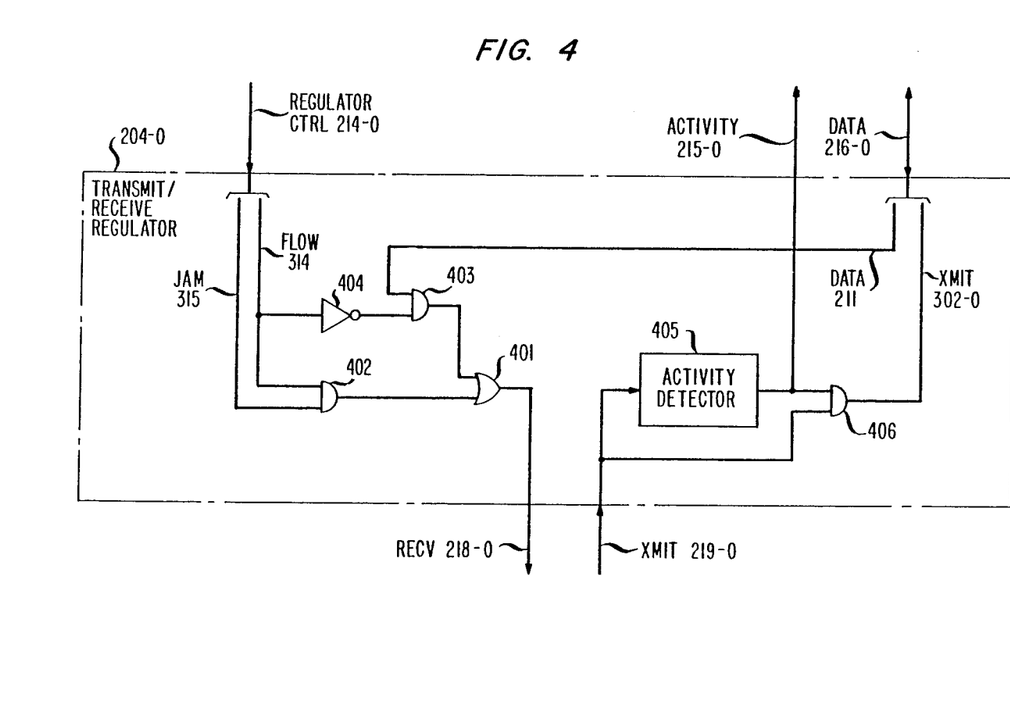
FIG. 4 discloses the details of a transmit/receive regulator which comprises the interface of FIG. 2.

FIG. 4 illustrates the circuit details of regulator 204-0 having associated T/R device 110-0. Assume that buffer 201 can accommodate a data packet of maximum length and that T/R device 110-0 is transmitting data. T/R device 110-0 extends the transmitted data to regulator 204-0 over XMIT path 219-0. The transmitted path is applied to activity detector 405 which generates an active or high activity signal on path 215-0. As previously described, an active activity signal indicates to controller 203 that an active transmission is occurring. The generated data on XMIT path 219-0 is also applied to AND gate 406 concurrently with the generated high activity signal on path 215-0. The combination of the data on path 219-0, and the high activity signal on path 215-0 enables gate 406 so that the data transmission is extended to processor 200 over path 216-0. Controller 203 applies "echo-data" over path 216-0 in the manner previously described. Data path 216-0 comprises data path 211 as previously discussed. The "echo-data" is applied over data path 211 to gate 403. Additionally, since buffer 201 can accommodate a maximum length data packet, the flow and jam signal are inactive and, therefore, the signal on paths 315 and 314 are low. The following table indicates the inputs and outputs of each gate under the above described conditions:

| | GENERATED OUTPUT OF OR GATE 401 |
|---|---|
| SIGNALS APPLIED TO GATE 403 | |
| DATA 211: D INVERTED FLOW: 1 | D |
| SIGNALS APPLIED TO GATE 402 | |
| FLOW: 0 JAM: 0 | ENABLE REGULATOR TO APPLY DATA |

D = DATA PRESENT

The combination of input signals at AND gate 403 enables AND gate 403 to transmit "echo-data" back to T/R device 110-0. As the above table indicates, OR gate 401 is enabled and applies the "echo-data" over path 218-0. The data is extended to T/R device 110-0 in the manner previously described. This condition occurs when the buffer contains sufficient space to accommodate a maximum length data packet.

Now, assume that processor 200 detects that buffer 201 cannot accommodate a data packet of maximum length. Assume further that no data transmission is currently in progress. Therefore no data exists on XMIT path 219-0 to apply to detector 405 and gate 406. In response to no present data transmission activity, Detector 405 applies a low signal over path 215-0. The combination of a low on 215-0 and no data on 219-0 is applied to AND gate 406. AND gate 406 generates a low output over XMIT data 302-0. These low signals indicate that no data transmission activity is present. Since no data is being transmitted, no "echo-data" is present on data 211. As previously described, since buffer 201 contains insufficient storage space, the jam and flow signal are active. The jam signal exists on path 315 and a high signal exists on 314. The following table indicates the inputs and outputs of each gate in response to the above-described conditions:

| | GENERATED OUTPUT OF OR GATE 401 |
|---|---|
| SIGNALS APPLIED TO GATE 403 | |
| DATA: X INVERTED FLOW: 0 | J |
| SIGNALS APPLIED TO GATE 402 | |
| FLOW: 1 JAM: J | ENABLE REGULATOR TO APPLY JAM SIGNAL |

X = DON'T CARE
J = ACTIVE JAM SIGNAL

The combination of the active jam signal and flow signal, a high, at AND gate 402 enables AND gate 402 to transmit the jam signal to the associated T/R device 110-0. As the table indicates, OR gate 401 is enabled. OR gate 401 applies the jam signal over path 218-0. The jam signal is extended to the T/R device, i.e. 110-0, to prevent further data transmissions since buffer 201 cannot accommodate another data packet of maximum length.

FIGS. 1 through 4 illustrated the hardware associated with the flow control arrangement; however, processor 200 is required to perform the monitoring function of buffer 201 and generate the appropriate signals to the hardware in response to the amount of buffer space available. Processor 200 accomplishes this task in response to firmware comprising processor 200. The remaining description discusses the firmware processing operation with respect to the flow control arrangement for data transmissions to the network.

Figure 5:
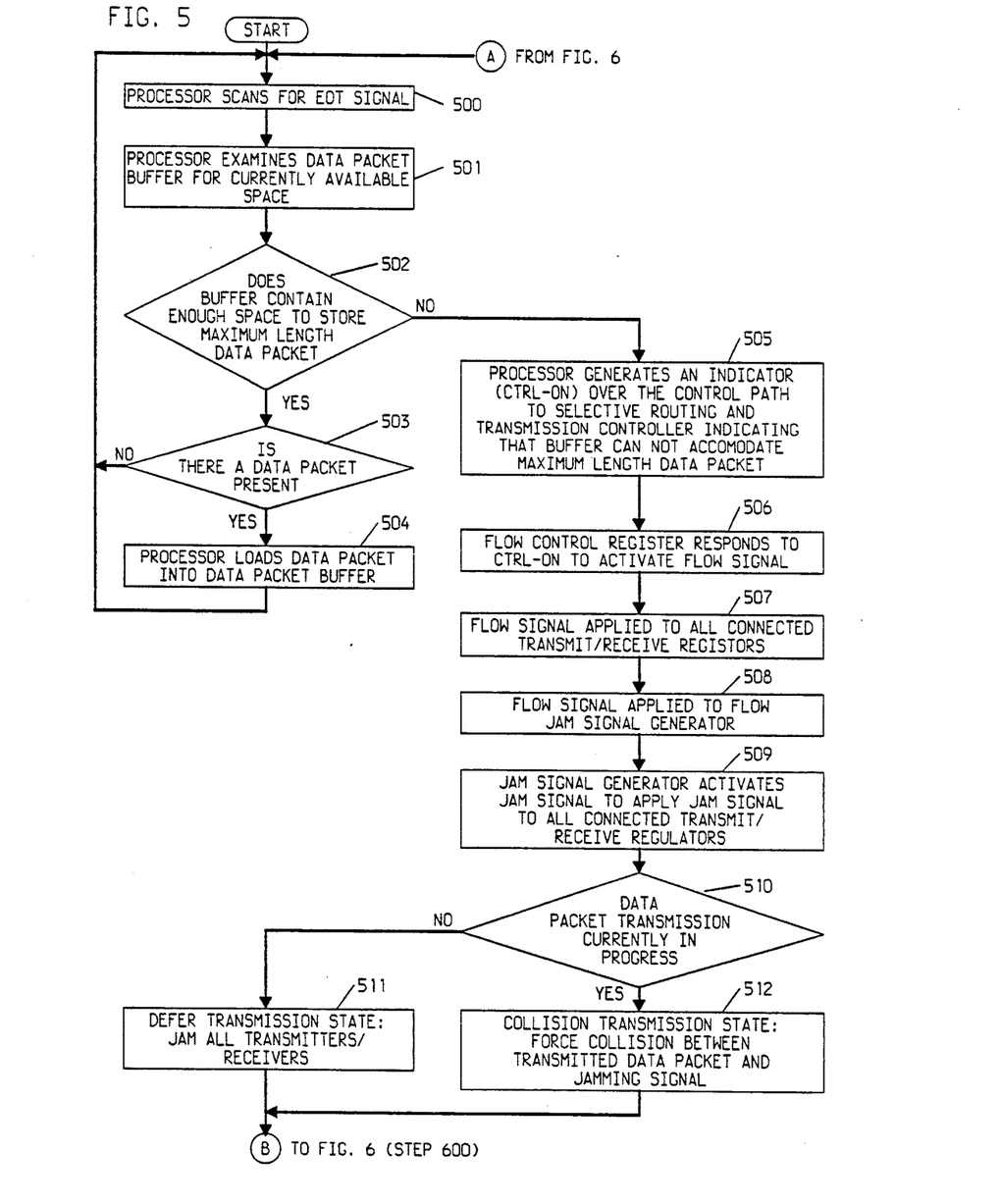
FIGS. 5 and 6 discloses in flow-chart form the steps in the operation of the flow control management arrangement.
Figure 6:
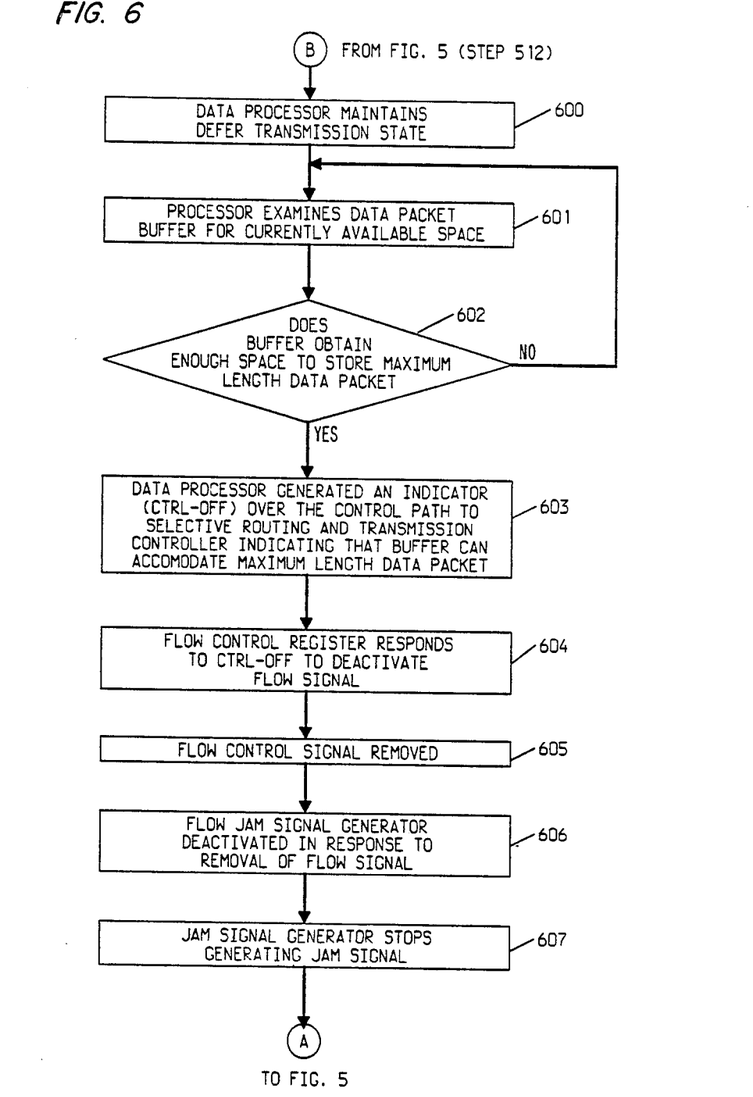

FIGS. 5 and 6 illustrate in flow chart form the firmware process which serves to control the flow of data packets of information to master communication bus 100 via interface 104-0 from stations 110-0 through 110-n. The firmware is included in processor 200. Processor 200, following each data transmission, executes the following operations with respect to buffer 201 since the terminated transmission was accommodated in buffer 201.

As previously described, at the conclusion of each transmission of a data packet controller 203 generates an EOT indication to processor 200 over path 207, see FIG. 2. This EOT indication, an active signal, indicates that the data transmission is terminated. Alternately, if the EOT signal is inactive, a data transmission is currently in progress. As step 500 of FIG. 5 indicates, processor 200 of FIG. 2 scans for the EOT signal and, in particular, for the EOT signal indicative of the termination of the transmission of an entire data packet from one of the stations 110-0 through 110-n. As previously described, buffer 201 is constantly monitored by processor 200. Assume a data transmission has occurred and the data packet is stored in buffer 201, and that no further data transmissions are currently present such that the EOT signal is active. In response to the detection of the active EOT signal on path 207, as step 501 indicates, processor 200 examines buffer 201 for currently available space, i.e. is the buffer full, partially full or empty following the data transmission. Processor 200, at step 502, examines the amount of space available to determine if buffer 201 can accommodate a data packet of maximum length. If buffer 201 can accommodate a data packet of maximum length, processing continues to step 503. With respect to the above assumed conditions of no data packet is present, processing returns to point A. Processor 200 again cycles through steps 500 through 503 assuming that the same conditions as described above exist.

Now, assume that a data packet is currently being transmitted from one T/R device 110-0 through 110-n and assume further that, at step 502, processor 200 determines that buffer 200 has enough space to accommodate a data packet of maximum length. Processor 200 detects the presence of a data packet at step 503 and therefore, processing advances to step 504. Processor 200 responds to the receipt of the data packet at step 504, and loads the data packet into buffer 201 since buffer 201 can accommodate a data packet of maximum length as determined at step 502. Following the loading of the transmitted data packet at step 504, processing returns to point A and resumes scanning for the EOT signal. Processor 200 responds to the transmission of other data packets or the non-existence of data packets as described above, and continually cycles through processing steps 500 through 504.

Assume, now, that at step 502, processor 200 determines that buffer 201 does not have enough space to accommodate a maximum length data packet. Therefore, processing advances from step 502 to step 505. At step 505, in response to the detection of not enough buffer space, processor 200 of FIG. 2 applies a control-on signal to controller 203 over path 220. The details of the control signal on path 220 were discussed previously. The generated control-on signal indicates that buffer 201 cannot accommodate a data packet of maximum length. Controller 203 extends the control-on signal to flow control register 312 on path 220, see FIG. 3. Processing continues to step 506. In response to the receipt of the control signal on path 220, flow control register 312 is activated, i.e. turns "on". Register 312 generates a flow signal on path 314 and extends, at step 507, the flow signal on path 314 to transmit/receive regulators 204-0 through 204-n over regulator control paths 214-0 through 214-n. Concurrently, register 312 applies the generated flow signal on path 314 to flow jam signal generator 313, at step 508. In response to the generated flow signal on path 314, generator 313 is activated, i.e. turns "on". Generator 313 generates a jam signal over path 315 and extends, at step 509, the generated jam signal on path 315 to transmit/receive regulators 204-0 through 204-n over regulator control paths 214-0 through 214-n. Both the active flow signal on path 314 and the active jam signal on path 315 are concurrently extended to transmit/receive regulators 204-0 through 204-n over paths 214-0 through 214-n when processor 200 detects a lack of space to accommodate a maximum length data packet in buffer 201. Processing advances to step 510.

Processor 200, at step 510, determines if the transmission of a data packet is currently in progress. As previously described, the presence of an active activity signals on path 215-0 through 215-n indicates whether one or more T/R devices 110-0 through 110-n are transmitting data. Detector 304, see FIG. 3, responds to the receipt of the active activity signal and generates an inactive EOT signal to indicate that a data transmission is occurring. The presence of an inactive activity signal on paths 215-0 through 215-n indicates that no T/R devices 110-0 through 110-n is transmitting data. Detector 304, see FIG. 3, responds to the receipt of the inactive activity signal and generates an active EOT signal to indicate that no data transmission is occurring.

Assume that an active EOT signal is present and therefore, no data transmission is occurring. In response to this condition of no current data transmission, processing advances from step 510 to step 511 where processing enters a defer transmission state occurs. In this state, all transmit/receive regulators 204-0 through 204-n respond to the generated flow and jam signal as received over regulator control paths 214-0 through 214-n. Regulators 204-0 through 204-n extend the jam signal to all T/R devices 110-0 through 110-n over receive paths 218-0 through 218-n. The logic for extending the signals through transmit/receive regulators 204-0 through 204-n was previously described. Processing then continues to step 600 of FIG. 6, and processor 200 maintains the defer transmission state to all stations, i.e. all stations are jammed so as to prevent any data transmission because buffer 201 cannot accommodate a data packet of maximum length.

Assume, now, that an inactive EOT signal is present, an inactive EOT signal indicates that a data transmission is currently in progress and therefore, at step 510, processing advances to step 512 rather than 511. Processing now enters a collision transmission state. In this state, all transmit/receive regulators 204-0 through 204-n respond to the generated flow and jam signals as applied over regulator control paths 214-0 through 214-n. Regulators 204-0 through 204-n extend the jam signal to all T/R devices 110-0 through 110-n over receive paths 218-0 through 218-n. The logic for extending the jam signal through transmit/receive regulators 204-0 through 204-n has been previously described with respect to FIGS. 3 and 4. In response to the above-described present conditions, buffer 201 cannot accommodate a data packet of maximum length and, therefore, the data transmission(s) is or are prohibited from reaching processor 200 in the following manner. The jam signal which is currently being applied to all T/R devices 110-0 through 110-n collides with the transmitted data packet(s). This collision destroys the data packet in the interface such that no further packet processing occurs. The feedback that a data packet was destroyed or lost is immediate such that a party at the transmitting T/R device is immediately aware that a retransmission is necessary following the removal of the jam signal. The T/R device will not transmit since buffer 201 cannot accommodate a data packet of maximum length. Following the collision between the data packet and the jamming signal as applied to associated T/R devices 110-0 through 110-n over paths 105-0 through 105-n, processing continues to step 600 of FIG. 6. At step 600, processor 200 maintains the defer transmission state previously described at step 511. The defer transmission state precludes the transmission of any further data packets. The transition between the collision state to the defer state only requires the maintenance of the jam signal which remains intact following the collision. In the above described manner, the flow of data is controlled at the interface.

Processing now advances to step 601 where processor 200 examines buffer 201 for any current available space. If there is space available in buffer 201, processor 200 advances to step 602 to determine if the space available is sufficient enough to accommodate, i.e. store, a data packet of maximum length. If the currently available space is not sufficient enough to store a maximum length data packet, then processor returns to steps 601 and 602, and continually monitors the storage capacity of buffer 201. Assume that after some period of time, processor 200 detects that buffer 201 does have enough space to store a maximum length data packet. To deplete buffer 210, assume processor 200 gained access to master communication bus 100. In response to the detection of sufficient buffer space, processing continues to step 603.

Processor 200, at step 603, generates a control-off signal to controller 203 over path 220. Controller 203 extends the control-off signal to register 312 over path 220, see FIG. 3. The control-off signal deactivates register 312, at step 604. In response to deactivation, register 312 turns the flow signal on path 314 "off". The flow signal on path 314 is removed as indicated at step 605. In response to the removal of the flow signal from path 314, flow jam signal generator 313 is deactivated at step 606. Generator 313 stops generating a jam signal on path 315 at step 607. At this point no flow or jam signal is present on leads 314 and 315, respectively. The absence of a flow and jam signal indicates that buffer 201 can currently accommodate a data packet of maximum length. Therefore, an inactive combination of the jam and flow signal is extended over regulator control paths 214-0 through 214-n to transmit/receive regulators 204-0 through 204-n. In response to inactive flow and jam signals, regulators 204-0 through 204-n cease the application of the jam signal to T/R devices 110-0 through 110-n over paths 218-0 through 218-n. The logic of regulators 204-0 through 204-n was previously described. Following the removal of the jam signal from all T/R devices 110-0 through 110-n, any T/R device 110-0 through 110-n may resume data transmission, and the processing operation returns to point A of FIG. 5. The processing operations for monitoring the available space in buffer 201 are continual since this is the method used to maintain the flow control of data transmissions.

The disclosed flow control arrangement at each interface serves to control the flow data transmissions from associated T/R devices. The disclosed arrangement precludes the administration of flow control by costly and time consuming processing operations by basing data transmission flow on a buffer's capacity to accommodate a data packet of maximum length. All T/R devices are precluded from transmitting data until such time as the buffer can again accommodate a data packet of maximum length.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. A packet data bus interconnecting a plurality of data transmitting and receiving devices via a plurality of interfaces where each interface control bus access for the transmission of data packets over said bus from a group of associated devices, a flow control arrangement for controlling the flow of data packets through said interface comprising:
   an interface processor for processing data transmissions;
   an interface buffer for storing a plurality of data packets received from said group of devices associated with said interface;
   means including said interface processor for detecting when said interface buffer contains insufficient space to store a specified maximum length data packet; and
   means connected to said interface processor and responsive to a detection of insufficient space for inhibiting the transmission of data packets by said group of devices associated with said interface.

2. The flow control arrangement of claim 1 wherein said arrangement further comprises:
   means for identifying an occurrence or non-occurrence of data transmission activity from at least one of said group of devices; and
   means for activating a defer transmission state at said group of devices during a non-occurrence of data transmission activity from any one of said devices when said interface buffer is determined to have insufficient space in which to store said maximum length data packet thereby preventing further data transmissions from said group of devices.

3. The flow control arrangement of claim 2 wherein said arrangement further comprises:
   means for identifying an occurrence or non-occurrence of data transmission activity from at least one of said group of devices; and
   means responsive to said detecting means indicating when said buffer contains insufficient space to store a next transmitted maximum length data packet for activating a collision transmission state at said group of devices during an occurrence of data transmission activity from any one of said devices thereby terminating said occurrence of said data transmission.

4. The flow control arrangement of claim 3 wherein said arrangement further comprises:
   means for detecting the termination of data transmission activity as generated from at least one of said group of devices to said bus for implementing said defer transmission state immediately following the termination of said transmission to prevent further data transmissions from said group of devices; and
   means for deactivating at said group of devices said defer transmission state when said interface buffer is determined to have sufficient space in which to store said maximum length data packet thereby enabling further data transmissions from said group of devices.

5. The flow control arrangement of claim 1 wherein said inhibiting means further comprises:
    means responsive to the detection, in said interface buffer, of insufficient space in which to store said maximum length data packet for generating a jam signal; and
    means for applying said jam signal to said group of devices to prevent any further data transmission.

6. The flow control arrangement of claim 5 wherein said applying means comprises:
    means connected between said group of devices and said interface processor for exchanging data packets therebetween;
    means connected between said group of devices and said generator means for applying said jam signal to said group of devices;
    means responsive to the detection, in said interface buffer, of insufficient space to store said maximum length data packet for providing a control signal to control the application of said jam signal;
    means for applying said control signal to said exchanging means to inhibit any further data transmission by said group of devices; and
    means responsive to said control signal for enabling said jam signal applying means to apply said generated jam signal to said plurality of devices.

7. The flow control arrangement of claim 6 wherein said arrangement further comprises:
    means for ceasing said application of said control signal when said buffer contains sufficient space to store said next transmitted maximum length data packet to terminate said application of said generated jam signal to said group of devices thereby enabling further data transmissions.

8. A packet data bus interconnecting a plurality of data transmitting and receiving devices via a plurality of interfaces where each interface controls bus access for the transmission of data packets over said packet data bus from a group of associated devices to said network, a method for controlling the flow of data packets through said interface to said packet data bus, wherein said method comprises the steps of:
    monitoring an interface buffer to detect when said interface buffer contains insufficient space to accommodate a specified maximum length data packet transmitted from any one of said group of devices associated with said interface;
    generating a jam signal when said interface buffer contains insufficient space to store a next transmitted maximum length data packet; and
    applying said jam signal to said group of devices to inhibit any further transmission of data packets from said group of devices.

9. A packet data bus interconnecting a plurality of data transmitting and receiving devices via a plurality interfaces where each interface controls bus access for the transmission of data packets over said packet data bus from a group of associated devices, a method for controlling the flow of data packets through said interface to said packet data bus, wherein said method comprises the steps of:
    identifying an occurrence or non-occurrence of data transmission activity from at least one of said devices associated with said interface;
    monitoring available space in an interface buffer to determine sufficient or insufficient space in which to store a specified maximum length data packet;
    activating a defer transmission state at all of said devices associated with said interface during a non-occurrence of data transmission activity from any of said devices associated with said interface when said interface buffer is determined to have insufficient space in which to store said maximum length data packet thereby preventing further data transmissions from said devices associated with said interface;
    activating a collision transmission state at all of said devices associated with said interface during an occurrence of data transmission activity from at least one of said devices associated with said interface when said interface buffer is determined to have insufficient space in which to store said maximum length data packet thereby terminating said occurrence of said data transmission;
    switching to said defer transmission state to prevent further data transmissions from said devices associated with said interface in response to the occurrence of said termination of said data transmission; and
    deactivating said defer transmission state at said devices associated with said interface when said interface buffer is determined to have sufficient space in which to store said maximum length data packet thereby enabling further data transmissions from said devices associated with said interface.

10. The method of claim 9 wherein said method further includes the steps of:
    generating a jam signal in response to said activation of said defer transmission state or said collision transmission state; and
    applying said jam signal to said devices associated with said interface to inhibit any further data transmissions.

* * * * *